United States Patent
Tarumoto et al.

(10) Patent No.: US 11,449,041 B2
(45) Date of Patent: Sep. 20, 2022

(54) FOOD PRODUCTION MANAGEMENT SYSTEM

(71) Applicant: ISHIDA CO., LTD., Kyoto (JP)

(72) Inventors: Yoshinori Tarumoto, Ritto (JP); Youichirou Abe, Ritto (JP); Norio Kawanishi, Ritto (JP); Yoshiki Fujita, Ritto (JP); Taiga Nada, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 140 days.

(21) Appl. No.: 16/880,927

(22) Filed: May 21, 2020

(65) Prior Publication Data

US 2020/0371508 A1 Nov. 26, 2020

(30) Foreign Application Priority Data

May 23, 2019 (JP) .............................. JP2019-097160

(51) Int. Cl.
*G05B 19/418* (2006.01)
*G06Q 10/06* (2012.01)
*G06Q 50/12* (2012.01)

(52) U.S. Cl.
CPC . *G05B 19/41885* (2013.01); *G05B 19/41835* (2013.01); *G06Q 10/06316* (2013.01); *G06Q 50/12* (2013.01)

(58) Field of Classification Search
None
See application file for complete search history.

(56) References Cited

U.S. PATENT DOCUMENTS

| 2004/0107845 | A1 | 6/2004 | Sunter et al. |
| 2006/0231295 | A1 | 10/2006 | Yamaguchi et al. |
| 2011/0130857 | A1* | 6/2011 | Budiman ............... G05B 13/04 700/104 |

FOREIGN PATENT DOCUMENTS

JP    H9-301327 A    11/1997

OTHER PUBLICATIONS

The Search Report from the corresponding European Patent Application No. 20175882.8 dated Jun. 26, 2020.

* cited by examiner

*Primary Examiner* — Carlos R Ortiz Rodriguez
(74) *Attorney, Agent, or Firm* — Shinjyu Global IP

(57) ABSTRACT

A food production management system that manages a food production process group having a plurality of production processes is disclosed. The food production management system includes a first acquisition unit and an output unit. The first acquisition unit acquires throughputs of each of the plurality of production processes. The output unit outputs first information. The first information includes information representing the throughputs of each of the plurality of production processes.

9 Claims, 9 Drawing Sheets

FIG. 4

DETAILED INFORMATION / FLAVORING PROCESS

| | PRODUCTION THROUGHPUT |
|---|---|
| FLAVORING DEVICE A | 750kg/h |
| FLAVORING DEVICE B | 200kg/h |
| FLAVORING DEVICE C | 200kg/h |

- PLAN REGISTRATION
- CURRENT FLOW
- PRODUCTION SUMMARY
- DETAILED INFORMATION

FIG. 5

FOOD PRODUCTION MANAGEMENT SYSTEM

CROSS-REFERENCE TO RELATED APPLICATIONS

This application claims priority to Japanese Patent Application No. 2019-097160, filed May 23, 2019. The contents of that application are incorporated by reference herein in their entirety.

TECHNICAL FIELD

The present invention relates to a food production management system for managing a food production process group.

BACKGROUND ART

Conventionally, as in Japanese Patent Application Publication No. JP-H09-301327A, a food production management system for managing a food production process group and capable of displaying production speed settings for each production process is known.

BRIEF SUMMARY

However, the food production management system of Japanese Patent Application Publication No. JP-H09-301327A just displays the settings, so when a problem occurs, such as a delay in the progress of production in the production process group, it is difficult to grasp which production process has the problem.

It is an object of the present invention to provide a food production management system for managing a food production process group and with which it is easy, when a problem occurs such as a delay in the progress of production in the production process group, to grasp which production process has the problem.

A food production management system pertaining to a first aspect of the invention is a system that manages a food production process group having plural types of production processes. The food production management system includes a first acquisition unit and an output unit. The first acquisition unit acquires throughputs of each of the production processes. The output unit outputs first information. The first information includes information representing the throughputs of each of the production processes.

In the food production management system of the first aspect, the first information including the information representing the throughputs of each production process is output, so when a problem occurs, such as a delay in the progress of production in the production process group overall, it is easy to grasp which production process has the problem.

A food production management system pertaining to a second aspect of the invention is the food production management system of the first aspect, wherein the first information further includes information representing connections between the production processes and/or branches of the production processes.

In the food production management system of the second aspect, when a problem occurs, such as a delay in the progress of production in the production process group overall, it is possible to easily grasp which production process is rate-limiting and to quickly take a countermeasure to the delay in progress.

A food production management system pertaining to a third aspect of the invention is the food production management system of the second aspect, wherein the first information is image information that displays nodes, links, and the information representing the throughputs of each of the production processes. The nodes represent each of the plural production processes. The links represent the connections between the production processes and/or the branches of the production processes.

In the food production management system of the third aspect, when a problem occurs, such as a delay in the progress of production in the production process group overall, it is possible to easily grasp which production process is rate-limiting and to quickly take a countermeasure to the delay in progress.

A food production management system pertaining to a fourth aspect of the invention is the food production management system of the third aspect, wherein the plural production processes include a first production process. The first information displays, in modes that differ between a case where the throughput of the first production process is equal to or greater than a first reference value set for the first production process and a case where the throughput of the first production process is smaller than the first reference value, the nodes representing the first production process and/or the information representing the throughput of the first production process.

The food production management system of the fourth aspect is convenient because a delay occurring in each production process can be instantaneously grasped.

A food production management system pertaining to a fifth aspect of the invention is the food production management system of the third aspect or fourth aspect, further including a second acquisition unit and a generation unit. The second acquisition unit acquires information representing associations between the production processes. The generation unit automatically generates, based on the information representing the associations between the production processes that the second acquisition unit has acquired, the image information of the first information in which the nodes representing each of the plural production processes are interconnected by the links representing the connections between the production processes and/or the branches of the production processes.

In a food plant, there are cases where the production flow is changed relatively frequently. For example, specifically, there are cases where the production flow is changed so that devices that had been used to produce a food with a certain flavor are used to produce a food with another flavor.

In the food production management system of the fifth aspect, the image information serving as the first information is automatically generated when the information representing the associations between the production processes is changed, so it is easy to manage the production processes using the food production management system immediately after the production flow is changed.

A food production management system pertaining to a sixth aspect of the invention is the food production management system of any of the first aspect to the fifth aspect, wherein regarding at least part of the production processes, the throughputs of each of the production processes include production throughputs and reject throughputs of each of the production processes.

In the food production management system of the sixth aspect, the first information includes production throughputs and reject throughputs, so problems in the production processes, such as an increase in the reject throughput even though the production throughput is meeting a standard, can also be grasped.

A food production management system pertaining to a seventh aspect of the invention is the food production management system of any of the first aspect to the sixth aspect, wherein the output unit further outputs, as second information, image information displaying in graph form the throughputs of each of the production processes.

In the food production management system of the seventh aspect, the throughputs of the production processes can be grasped even more easily by the second information displaying in graph form the throughputs of each production process.

A food production management system pertaining to an eighth aspect of the invention is the food production management system of any of the first aspect to the seventh aspect, wherein the first information further includes information representing increasing/decreasing states of the throughputs of the production processes.

In the food production management system of the eighth aspect, it is possible to grasp not only the throughputs of the production processes but also whether the throughputs are tending to increase or tending to decrease, and it is easy to accurately grasp the statuses of the production processes.

A food production management system pertaining to a ninth aspect of the invention is the food production management system of any of the first aspect to the eighth aspect, wherein the throughputs of each of the production processes are processed weights per unit time or processed numbers per unit time.

In the food production management system of the ninth aspect, the throughputs of each production process can be easily grasped by weight or quantity.

A food production management system pertaining to a tenth aspect of the invention is the food production management system of any of the first aspect to the ninth aspect, wherein the types of the production processes include at least one of a material input process, a flavoring process, a weighing process, a packaging process, an inspection process, and a box packing process.

In the food production management system pertaining to the invention, the first information including the information representing the throughputs of each production process is output, so when a problem occurs, such as a delay in the progress of production in the production process group overall, it is easy to grasp which production process has the problem.

BRIEF DESCRIPTION OF THE DRAWINGS

FIG. 4 is an example of second information that the food production management system of FIG. 1 outputs;

FIG. 5 is an example of third information that the food production management system of FIG. 1 outputs;

DETAILED DESCRIPTION

A food production management system 100 pertaining to an embodiment of the invention will be described with reference to the drawings. The following description is merely an example of the invention and is not intended to limit the scope of the invention. Various changes can be made to the following embodiment without departing from the spirit and scope of the invention.

(1) Overall Configuration

An overview of the food production management system 100 and a production process group 1 that is managed by the food production management system 100 will be described with reference to FIG. 1 and FIG. 2.

Figure 1:
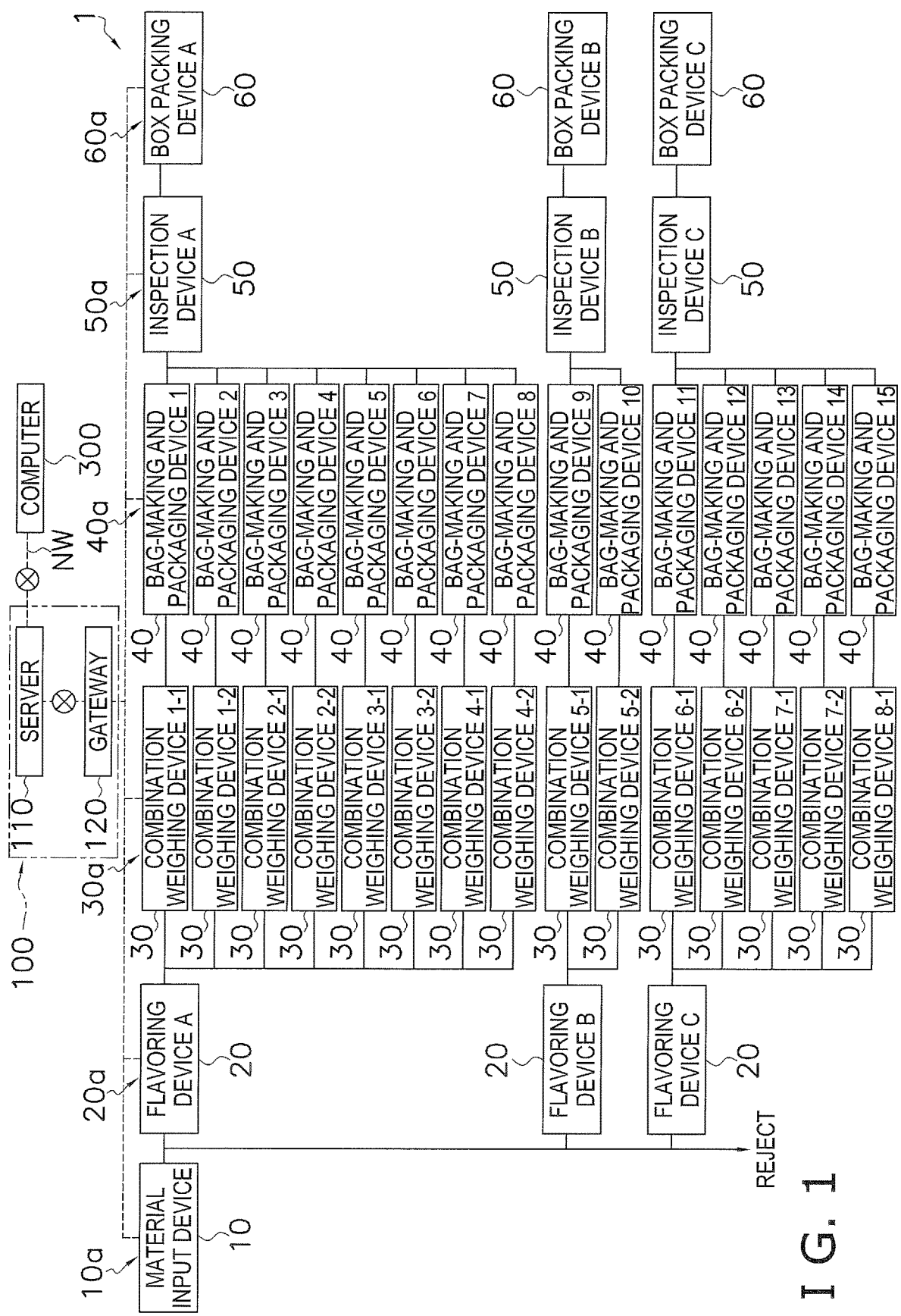
FIG. 1 is a block diagram schematically showing a food production management system pertaining to the invention and a production process group managed by the food production management system.

FIG. 1 is a block diagram schematically showing the food production management system 100 and the production process group 1 managed by the food production management system 100. FIG. 2 is a block diagram of the food production management system 100 of FIG. 1.

The food production management system 100 is a system that manages the food production process group 1. The production process group 1 has plural production processes. Furthermore, the production process group 1 has plural types of production processes.

In the production process group 1 of this embodiment, articles that are supplied are flavored, a predetermined quantity of the articles that have been flavored are packed in bags, and the bags packed with the articles are boxed. The food production management system 100 can also be applied to the management of a production process group for a variety of foods. Furthermore, the food production management system 100 can also be applied to the management of a production process group including types of production processes other than those described below and the management of a production process group not including some or all of the types of production processes described below.

The food production management system 100 of this embodiment mainly provides, as functions for managing the food production process group, the function of acquiring information representing the production statuses of each production process and visualizing the production status of the food production process group. The information representing the production status of each production process includes the throughputs of each production process. The food production management system 100 has, for example, the function of outputting first information G1 including information representing the throughputs of each of the production processes. In this embodiment, the food production management system 100 outputs the first information G1 to a computer 300 installed in a food production plant that has the production process group 1. However, the configuration of the output of the information is not limited to this configuration, and the food production management system 100 can also output the first information G1 to a portable information terminal portably carried by, for example, a worker who works at the food production plant. Furthermore, the food production management system 100 can also display (output) the first information G1 on a display (not shown in the drawings) included in the food production management system 100. Furthermore, the food production management system 100 can also print (output) the first information G1 by means of a printer (not shown in the drawings) included in the food production management system 100. It is preferred that the food production management system 100 output the first information G1 to the computer 300 or the like in real time or almost in real time.

Furthermore, it is preferred that the food production management system 100 output, as second information G2, image information displaying in graph form the throughputs of each of the production processes. Moreover, it is preferred that the food production management system 100 output, as third information G3, image information representing a summary of the production of the production process group.

The output of the first information G1, the second information G2, and the third information G3 by the food production management system 100 will be described in detail later.

Besides the function of outputting the first information G1, the second information G2, and the third information G3, the food production management system 100 can also have functions such as storing a production history of the production process group 1 and performing various types of analyses on the stored production history, and transmitting various types of instructions to devices used in each production process. However, in this embodiment, description of functions not particularly related to the output of the first information G1, the second information G2, and the third information G3 by the food production management system 100 will be omitted.

(2) Detailed Description (2-1) Production Process Group

The production process group 1 that is managed by the food production management system 100 will be described.

The production process group 1 includes, as the plural types of production processes a material input process 10a, a flavoring process 20a, a weighing process 30a, a packaging process 40a, an inspection process 50a, and a box packing process 60a (see FIG. 1). The material input process 10a, the flavoring process 20a, the weighing process 30a, the packaging process 40a, the inspection process 50a, and the box packing process 60a are sequentially arranged in this order from upstream. The types of production processes mentioned here are merely exemplary, and the types of production processes included in the production process group will differ depending on, for example, the type of food that the production process group handles. For example, in this embodiment, the production process group 1 includes the flavoring process 20a, but depending on, for example, the type of food, the production process group 1 might not include the flavoring process 20a.

The material input process 10a is a process of conveying, to the flavoring process 20a, articles that have been processed in a previous process (hereafter, the articles before being flavored will be called material articles). The flavoring process 20a is a process of flavoring the material articles that have been input. The weighing process 30a is a process of weighing out a predetermined weight of the articles that have been flavored (hereafter called flavored articles). The packaging process 40a is a process of packaging (bagging) the flavored articles with the predetermined weight that has been weighed out by the weighing process 30a. The inspection process 50a is a process of performing an inspection for the flavored articles that have been bagged (hereafter called bagged articles). The content of the inspection will be described later. The box packing process 60a is a process of boxing the bagged articles that have been determined to be conforming as a result of the inspection by a predetermined quantity.

Each of these types of production processes will be further described below.

(2-1-1) Material Input Process

In the material input process 10a, a material input device 10 is used (see FIG. 1). The material input device 10 includes conveyors. The conveyors convey the material articles. The conveyors supply the material articles to later-described plural flavoring devices 20 of the flavoring process 20a. The conveyors distribute the material articles to each of the flavoring devices 20 in accordance with the production throughputs of each flavoring device 20 and supply them to each of the flavoring devices 20. Furthermore, if there are non-conforming articles in the material articles, the conveyors convey that material article as a reject article to a reject receptacle (not shown in the drawings).

(2-1-2) Flavoring Process

In the flavoring process 20a, flavoring devices 20 are used (see FIG. 1). In this embodiment, three flavoring devices 20 are used in the flavoring process 20a. However, the number of the flavoring devices 20 can be appropriately decided. Here, the processing performed by each of the plural flavoring devices 20 is referred to as a separate production process (flavoring process). In other words, in this embodiment, the flavoring process 20a includes plural flavoring processes. In this embodiment, the three flavoring devices 20 flavor the material articles with different flavors each other. However, the three flavoring devices 20 can also be devices that flavor the material articles with the same flavor.

(2-1-3) Weighing Process

In the weighing process 30a, combination weighing devices 30 are used (see FIG. 1). In this embodiment, fifteen combination weighing devices 30 are used in the weighing process 30a. However, the number of the combination weighing devices 30 can be appropriately decided. Here, the processing performed by each of the plural combination weighing devices 30 is referred to as a separate production process (weighing process). In other words, in this embodiment, the weighing process 30a includes plural weighing processes.

The combination weighing devices 30 will be generally described. Each of the combination weighing devices 30 disperses, by means of a dispersion mechanism (not shown in the drawings), the flavored articles supplied from the flavoring process 20a by a conveyor (not shown in the drawings) and supplies them to plural weigh hoppers (not shown in the drawings). A scale provided in each weigh hopper weighs the weights of the flavored articles that have been supplied to the weigh hopper. The combination weighing machine 30 selects several weigh hoppers from among the plural weigh hoppers so that the combined weight of the flavored articles becomes a predetermined value and supplies, to a bag-making and packaging device 40 corresponding to that combination weighing device 30, the flavored articles in the weigh hoppers it selected. The bag-making and packaging device 40 is a device used to bag the articles in the packaging process 40*a*. Common combination weighing devices are already known, so detailed description thereof will be omitted.

(2-1-4) Packaging Process

In the packaging process 40*a*, bag-making and packaging devices 40 are used (see FIG. 1). In this embodiment, fifteen bag-making and packaging devices 40 are used in the packaging process 40*a*. However, the number of the bag-making and packaging devices 40 can be appropriately decided. Here, the processing performed by each of the plural bag-making and packaging devices 40 is referred to as a separate production process (packaging process). In other words, in this embodiment, the packaging process 40*a* includes plural packaging processes. Each bag-making and packaging device 40 corresponds to one of the upstream combination weighing devices 30. In other words, each bag-making and packaging device 40 receives a supply of the flavored articles from the upstream combination weighing device 30 to which it corresponds.

The bag-making and packaging devices 40 will be generally described. The bag-making and packaging devices 40 are devices that use a packaging material to bag a predetermined weight of the flavored articles that the corresponding combination weighing devices 30 supply. The bag-making and packaging devices 40 are vertical pillow type packaging devices. Each bag-making and packaging device 40 forms a film serving as the packaging material into a tube and vertically seals the tubular film. The flavored articles that the combination weighing device 30 supplies are input to the tubular film that has been formed by the bag-making and packaging device 40. Then, the bag-making and packaging device 40 transversely seals the tubular film into which the flavored articles have been input and thereafter cuts the transversely sealed portion in the substantially middle position thereof to separate it from the tubular film, thereby making a bag filled with the flavored articles. Common vertical pillow type packaging devices are already known, so detailed description thereof will be omitted.

(2-1-5) Inspection Process

In the inspection process 50*a*, inspection devices 50 are used (see FIG. 1). In this embodiment, three inspection devices 50 are used in the inspection process 50*a*. However, the number of the inspection devices 50 can be appropriately decided. Furthermore, in the inspection process 50*a*, different types of inspection devices can be installed in plural rows along the processes flow direction. In other words, in the inspection process 50*a*, plural types of inspections can be performed. Here, the processing performed by each of the plural inspection devices 50 is referred to as a separate production process (inspection process). In other words, in this embodiment, the inspection process 50*a* includes plural inspection processes.

The inspection devices 50 are, for example, metal detection devices that inspect for metal contaminants in the bagged articles, though this is not intended to be limiting. The inspection devices 50 are, for example, X-ray inspection devices that inspect for contaminants in the bagged articles. The inspection devices 50 are, for example, weight checking devices that measure the weights of the bagged articles to determine whether or not the measured values of the weights are in a predetermined range. The inspection devices 50 are, for example, seal checking devices that detect seal defects in the bags. The inspection devices exemplified here are already known, so detailed description thereof will be omitted.

Bagged articles determined to be non-conforming articles in the inspection process 50*a* are removed from the process by a non-conforming article removal mechanism (not shown in the drawings) and are conveyed as reject articles to a reject receptacle (not shown in the drawings).

(2-1-6) Box Packing Process

In the box packing process 60*a*, box packing devices 60 are used (see FIG. 1). In this embodiment, three box packing devices 60 are used in the box packing process 60*a*. However, the number of the box packing devices 60 can be appropriately decided. In this embodiment, three box packing devices 60 are illustrated in FIG. 1, but the number of the box packing devices 60 can be arbitrarily decided. Here, the processing performed by each of the plural box packing devices 60 is referred to as a separate production process (box packing processes). In other words, in this embodiment, the box packing process 60*a* includes plural box packing processes.

Though this is not intended to limit their type, the box packing devices 60 are, for example, devices that open collapsed cardboard sheets, seal bottom lids thereof to form cardboard boxes, put a predetermined quantity of the bagged articles into the boxes, and thereafter close upper lids thereof to box pack the bagged articles. The box packing devices 60 can be devices that use a robot to put a predetermined quantity of the bagged articles into containers such as already-formed cardboard boxes and thereafter close upper lids thereof to box pack the bagged articles. Common box packing devices are already known, so detailed description thereof will be omitted here.

(2-1-7) Controllers

The material input device 10, the flavoring devices 20, the combination weighing devices 30, the bag-making and packaging devices 40, the inspection devices 50, and the box packing devices 60 described above each have a controller (not shown in the drawings) that controls the actions of the device. Hereafter, when simply stating "the controllers," this will collectively refer to the controllers of the material input device 10, the flavoring devices 20, the combination weighing devices 30, the bag-making and packaging devices 40, the inspection devices 50, and the box packing devices 60. In another embodiment, instead of the material input device 10, the flavoring devices 20, the combination weighing devices 30, the bag-making and packaging devices 40, the inspection devices 50, and the box packing devices 60 each having a controller, some or all of the plural devices 10, 20, 30, 40, 50, and 60 can be controlled by a common controller.

The controllers each have a microcontroller unit (MCU) and various types of electrical circuits and electronic circuits (not shown in the drawings). The MCU includes a CPU, a memory, and an input/output interface. The memory of the MCU stores various types of programs for the CPU of the MCU to execute. The various types of functions of the controller can be performed by hardware, by software, or by hardware and software working together.

The material input device 10, the flavoring devices 20, the combination weighing devices 30, the bag-making and packaging devices 40, the inspection devices 50, and the box packing devices 60 are communicably connected to a gateway 120 of the food production management system 100 as indicated by the dashed lines in FIG. 1. In order to keep the drawing from becoming complicated, FIG. 1 illustrates just some of the flavoring devices 20, the combination weighing devices 30, the bag-making and packaging devices 40, the inspection devices 50, and the box packing devices 60 as being connected by dashed lines to the gateway 120. However, actually, the controllers of the devices 10, 20, 30, 40, 50, and 60 are communicably connected by a wireless or wired LAN, a serial interface, or others, to the gateway 120. Some or all of the controllers of the devices 10, 20, 30, 40, 50, and 60 can be communicably connected via a network NW such as the Internet to a later-described server 110 of the food production management system 100 not via the gateway 120.

Each of the controllers grasps, every predetermined amount of time, the throughput of the device it controls. It will be noted that what is meant by grasping the throughput every predetermined amount of time is grasping the throughput in such a way that the treated amount is graspable.

For example, the controller of the material input device 10 grasps, every predetermined amount of time, weight data of the material articles the device has conveyed. Furthermore, it is preferred that the controller of the material input device 10 also grasp, every predetermined amount of time, weight data of the material articles the device has rejected as non-conforming articles.

The controller of each flavoring device 20 grasps, every predetermined amount of time, weight data of the material articles the device has flavored (the flavored articles the device has made). Specifically, the controller of each flavoring device 20 obtains information from a scale provided in the conveyor of the material input device 10 and grasps, every predetermined amount of time, weight data of the flavored articles the device 20 has made.

The controller of each combination weighing device 30 performs combination weighing and grasps, every predetermined amount of time, weight data of the flavored articles the device 30 has supplied to the bag-making and packaging device 40. Specifically, the controller of each combination weighing device 30 grasps, every predetermined amount of time and on the basis of the results of the measurements of the flavored articles by the scales provided in the weigh hoppers, weight data of the flavored articles the device 30 has supplied to the bag-making and packaging device 40.

The controller of each bag-making and packaging device 40 grasps, every predetermined amount of time, quantity data of the bagged articles the device 40 has made.

The controller of each inspection device 50 grasps, every predetermined amount of time, weight data of the bagged articles the device 50 has inspected and/or quantity data of the bagged articles the device 50 has inspected. Furthermore, the controller of each inspection device 50 can also grasp, every predetermined amount of time, weight and/or quantity data of the bagged articles the controller of each inspection device 50 has judged as being non-conforming articles (rejected as non-conforming articles).

The controller of each box packing device 60 grasps, every predetermined amount of time, quantity data of the bagged articles the device 60 has box packed.

Each of the controllers of the devices 10, 20, 30, 40, 50, and 60 transmits, at a predetermined timing, the throughputs of the device that the controller controls to the gateway 120. For example, each of the controllers of the devices 10, 20, 30, 40, 50, and 60 transmits to the gateway 120, at predetermined time intervals, the throughputs for the predetermined time as to the device that the controller controls.

Furthermore, each of the controllers grasps a target throughput of the device it controls. The target throughput is given by a weight value, in a case where data of the throughput of the device the controller grasps is a weight. The target throughput is given by a quantity, in a case where data of the throughput of the device the controller grasps is a quantity. The target throughput is an example of a first reference value. The controllers of the devices 10, 20, 30, 40, 50, and 60 also transmit, at a predetermined timing, to the gateway 120, the target throughputs of the devices they control.

Furthermore, the controllers of the devices 20, 30, 40, 50, and 60 grasp to which devices the devices they control are connected at upstream side. For example, describing this using FIG. 1 as an example, the controller of the combination weighing device 1-1 grasps that the combination weighing device 1-1 is connected to the flavoring device A at upstream side. Furthermore, the controller of the bag-making and packaging device 1 grasps that the bag-making and packing device 1 is connected to the combination weighing device 1-1 at upstream side. Furthermore, the controller of the inspection device A grasps that the inspection device A is connected to the bag-making and packaging device 1 at upstream side. Furthermore, the controller of the box packing device A grasps that the box packing device A is connected to the inspection device A at upstream side. The same also holds for the controllers of the other devices, so description thereof will be omitted. The controllers of the devices 20, 30, 40, 50, and 60, when the upstream device to which the device the controller controls is connected is changed, transmits to the gateway 120 information (called process-related information) relating to the upstream device to which the device the controller controls is connected.

Example Modifications Relating to Production Process Group (A) Example Modification 1

In the above embodiment, the controllers that control the actions of the devices 10, 20, 30, 40, 50, and 60 grasp the throughputs of the devices they control and to which devices the devices they control are connected at upstream. However, instead of the controllers, other devices can grasp these.

For example, in the food plant, weighing devices and/or counting devices that are independent of the devices 10, 20, 30, 40, 50, and 60 and grasp the throughputs, every predetermined amount of time, of at least some of the devices 10, 20, 30, 40, 50, and 60 can also be installed. These weighing devices and/or counting devices can also be communicably connected to the gateway 120 and transmit, at a predetermined timing to the gateway 120, the throughputs of at least some of the devices 10, 20, 30, 40, 50, and 60.

Furthermore, for example, the food plant can have a central control device that monitors the actions of the devices 10, 20, 30, 40, 50, and 60 and grasps the throughputs, every predetermined amount of time, of at least some of the devices 10, 20, 30, 40, 50, and 60. The central control device can transmit, at a predetermined timing to the gateway 120, the throughputs of at least some of the devices 10, 20, 30, 40, 50, and 60.

Furthermore, the central control device can grasp to which devices the devices 20, 30, 40, 50, and 60 are connected at upstream. When the connection of a device is changed, the central control device can transmit, to the gateway 120, information relating to which devices the devices 20, 30, 40, 50, and 60 are connected to at upstream.

(B) Example Modification 2

In the above embodiment, it is assumed that the production processes 10*a*, 20*a*, 30*a*, 40*a*, 50*a*, and 60*a* are executed by the devices 10, 20, 30, 40, 50, and 60. However, as long as the throughputs of each production process can be grasped, some or all of the processes 10*a*, 20*a*, 30*a*, 40*a*, 50*a*, and 60*a* can also include work performed by people.

(2-2) Food Production Management System

The food production management system 100 will be described below. As mentioned above, description regarding functions of the food production management system 100 other than the function of outputting the later-described first information G1, second information G2, and third information G3 will be omitted except in cases where it is necessary.

The food production management system 100 mainly includes the gateway 120 and the server 110. The gateway 120 can be omitted in a case where the controllers of the devices 10, 20, 30, 40, 50, and 60 can all communicate directly with the server 110.

(2-2-1) Gateway

The gateway 120 is a device that has various types of electrical circuits and electronic circuits, a CPU, a memory, and an input/output interface and transmits to the server 110 various types of data transmitted from the controllers of the devices 10, 20, 30, 40, 50, and 60. The gateway 120 is communicably connected to the controllers of the devices 10, 20, 30, 40, 50, and 60 by a wireless or wired LAN or a serial interface, for example. Furthermore, the gateway 120 is communicably connected to the server 110 by the network NW such as the Internet.

The data transmitted from the controllers to the gateway 120 include the throughputs of the devices 10, 20, 30, 40, 50, and 60. The throughputs of the devices 10, 20, 30, 40, 50, and 60 are data with which it is possible to grasp the treated amount of the devices 10, 20, 30, 40, 50, and 60 for each unit time. In other words, the throughputs of the devices 10, 20, 30, 40, 50, and 60 are data with which it is possible to grasp the treated amount of each of the production processes of the production process group 1 for each unit time. Furthermore, the data transmitted from the controllers to the gateway 120 include the target throughputs of the devices 10, 20, 30, 40, 50, and 60. Furthermore, the data transmitted from the controllers to the gateway 120 include the information relating to the upstream devices to which the devices 20, 30, 40, 50, and 60 are connected. In other words, the data transmitted from the controllers to the gateway 120 include the information (the process-related information) representing the associations between the production processes of the production process group 1.

The gateway 120 transmits to the server 110 the above-described information that has been transmitted from the controllers of the devices 10, 20, 30, 40, 50, and 60. The gateway 120 can transmit as is to the server 110 the above-described information that has been transmitted from the controllers of the devices 10, 20, 30, 40, 50, and 60, or can transmit the information to the server 110 after performing some kind of processing on the information. The gateway 120 can successively transmit to the server 110 the above-described information that has been transmitted from the controllers of the devices 10, 20, 30, 40, 50, and 60, or can consolidate some of the information and transmit it to the server 110.

(2-2-2) Server

The server 110 is a computer that outputs the first information G1, the second information G2, and the third information G3 to the computer 300 installed in the food plant. The functions of the server 110 described here can be realized by one computer or can be realized by plural computers working together.

The server 110 is communicably connected to the gateway 120 via the network NW such as the Internet. Furthermore, the server 110 is communicably connected to the computer 300 via the network NW.

The computer is an ordinary computer having a CPU, a storage device, and an input/output device. The server 110 generates, and outputs to the computer 300, the later-described first information G1, second information G2, and third information G3 as a result of the CPU executing a program for managing the production process group 1 stored in the storage device. As mentioned above, the destination to which the server 110 outputs the first information G1, the second information G2, and the third information G3 is not limited to the computer 300.

Figure 2:
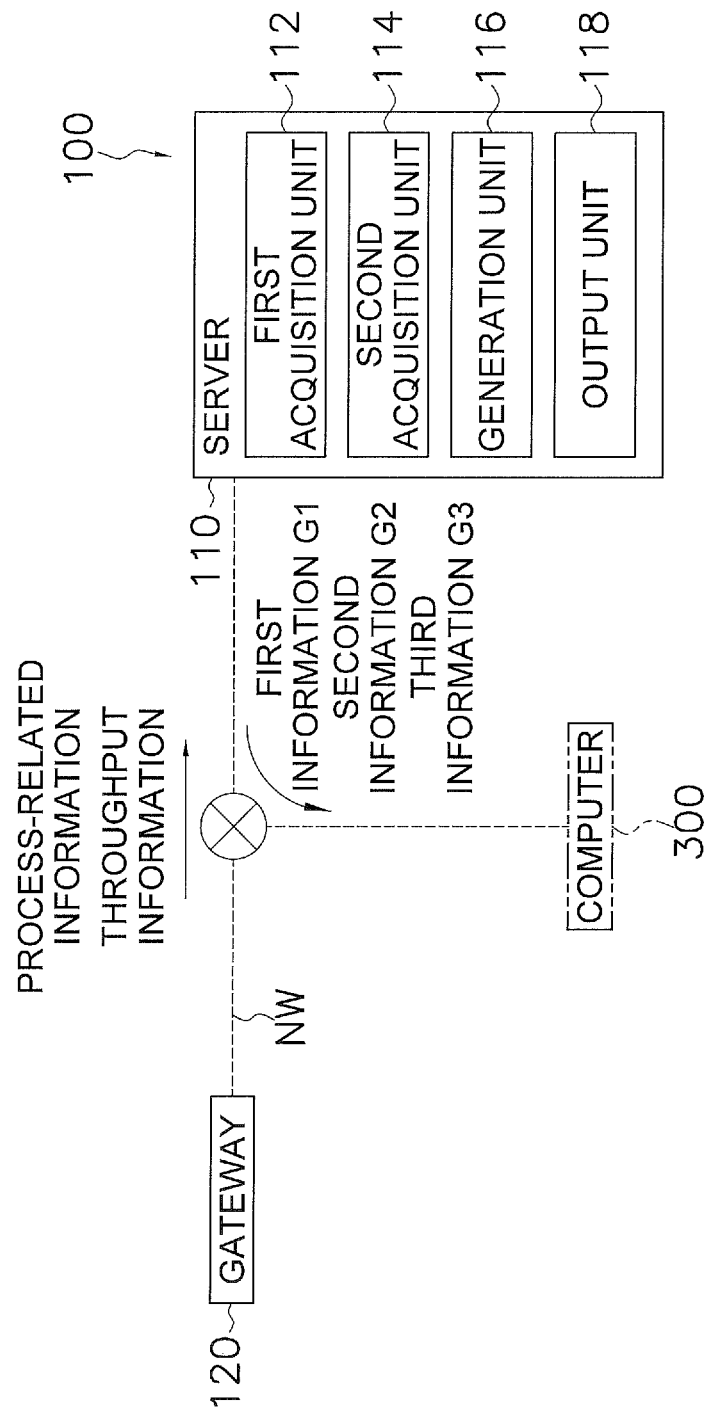
FIG. 2 is a block diagram of the food production management system of FIG. 1.

The server 110, as a result of the CPU executing the program stored in the storage device, functions as a first acquisition unit 112, a second acquisition unit 114, a generation unit 116, and an output unit 118 as functional units relating to the generation and output of the first information G1, the second information G2, and the third information G3 (see FIG. 2). These functional units will be described in detail below.

Functions described below as being executed by one functional unit can also be executed by two or more different functional units. For example, below, the generation unit 116 generates the first information G1, the second information G2, and the third information G3, but these sets of information can also be generated by mutually different functional units. Furthermore, conversely, functions described below as being executed by two or more functional units can also be executed by one functional unit. For example, the functions of the first acquisition unit 112 and the second acquisition unit 114 described below can also be executed by one functional unit.

(2-2-2-1) First Acquisition Unit

The first acquisition unit 112 acquires the throughputs of each of the production processes transmitted via the gateway 120 from the controllers of the devices 10, 20, 30, 40, 50, and 60. Specifically, the first acquisition unit 112 acquires information based on the throughputs of the devices 10, 20, 30, 40, 50, and 60 that the gateway 120 has acquired from the controllers and then transmits. Here, the expression "the first acquisition unit 112 acquires the throughputs of each of the production processes" is not limited to a case where the first acquisition unit 112 acquires the throughputs themselves of each of the production processes. The expression "the first acquisition unit 112 acquires the throughputs of each of the production processes" includes a case where the first acquisition unit 112 acquires information with which it is possible for the server 110 to calculate, by computation, the throughputs of each of the production processes.

Furthermore, the first acquisition unit 112 acquires the target throughputs of each of the production processes transmitted via the gateway 120 from the controllers of the devices 10, 20, 30, 40, 50, and 60.

(2-2-2-2) Second Acquisition Unit

The second acquisition unit 114 acquires the information representing the associations between the production processes of the production process group 1 from the gateway 120. Specifically, the second acquisition unit 114 acquires the information, transmitted from the gateway 120, relating to the upstream devices to which the devices 20, 30, 40, 50, and 60 are connected. Here, the expression "the second acquisition unit 114 acquires the information representing the associations between the production processes of the production process group 1" is not limited to a case where the second acquisition unit 114 acquires the information itself about the associations between the production processes of the production process group 1. The expression "the second acquisition unit 114 acquires the information representing the associations between the production processes of the production process group 1" includes a case where the second acquisition unit 114 acquires information with which the server 110 can grasp the associations between the production processes of the production process group 1.

(2-2-2-3) Generation Unit

The generation unit 116 generates the first information G1.

Figure 3:
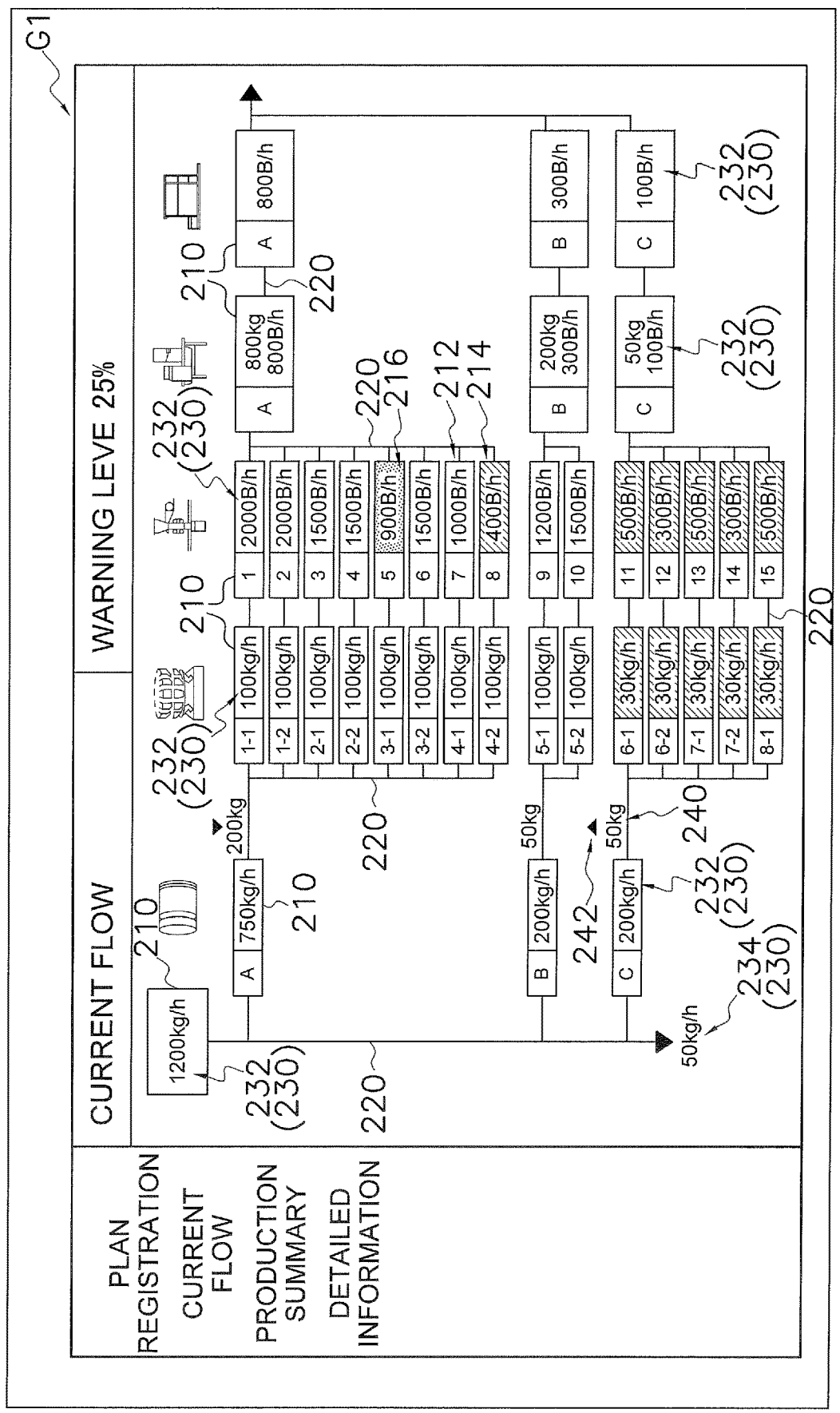
FIG. 3 is an example of first information that the food production management system of FIG. 1 outputs.

The first information G1 includes the information representing the throughputs of each of the production processes. The first information G1 is, for example, image information such as shown in FIG. 3.

The first information G1 in FIG. 3 will be described. The first information G1 is image information that mainly displays nodes 210 (212, 214, 216), links 220, and information 230 (232, 234) representing the throughputs of each of the production processes. The numbers 210, 212, 214, 216, 220, 230, 232, 234, 240, and 242 appearing in FIG. 3 are reference signs for description and are not numbers displayed by the first information G1. In order to keep the drawing from becoming complicated, in FIG. 3 reference signs are assigned only to some of the nodes, links, and information representing the throughputs of each of the production processes.

The nodes 210 represent each of the plural production processes. As will be understood by comparing FIG. 1 and FIG. 3, in the first information G1, each production process is represented by a node 210. In other words, in the first information G1 of this embodiment, the production processes corresponding to each of the material input device 10, the flavoring devices 20, the combination weighing devices 30, the bag-making and packaging devices 40, the inspection devices 50, and the box packing devices 60 are represented by the nodes 210. The nodes 210 do not need to be represented by quadrilaterals and can be represented by other shapes, drawings, or photographs and others. For example, the nodes 210 can be represented by drawings or photographs of the devices.

The links 220 represent connections between the production processes and branches of the production processes. Here, "represent connections between the production processes" means showing the production process to which articles will next be sent after a certain production process has been executed to the articles. Furthermore, "represent branches of the production processes" means showing to which production process the articles are branched after a certain production process has been executed to the articles. Furthermore, "represent branches of the production processes" includes showing that some articles are rejected after a certain production process has been executed to articles. In this embodiment, the links 220 are displayed as lines interconnecting the nodes 210.

In this embodiment, the information 230 representing the throughputs of each of the production processes includes information 232 representing production throughputs of each of the production processes. Furthermore, in some of the production processes, the information 230 representing the throughputs of the production processes includes information 234 representing reject throughputs of each of the production processes.

In this embodiment, the information 232 representing the production throughputs of each of the production processes is displayed inside the quadrilaterals of the nodes 210 representing each production process. The display positions of the information 232 representing the production throughputs are not limited to inside the nodes 210, and the display positions can be appropriately chosen as long as it is possible to grasp which production throughputs correspond to which production processes.

In this embodiment, the information 234 representing the reject throughputs of the production processes is displayed only for the material input process 10a (see the text shown under the arrow extending downward from the node 210 in the upper left corner representing the material input process in FIG. 3). In a case where reject throughputs of the production processes exist as data regarding other production processes (e.g., the inspection process), the first information G1 can also include information 234 representing the reject throughputs of each of those production processes.

As shown in FIG. 3, the information relating to the throughputs of each of the production processes (the information 232 representing the production throughputs and the information 234 representing the reject throughputs) is given in processed weights per unit time or processed numbers per unit time. In FIG. 3, in relation to the inspection process 50a, the information 232 representing the production throughputs of each of the production processes is given in both processed weights per unit time and processed numbers per unit time. The throughputs of each of the production processes can be expressed as something other than weight and quantity. For example, in accordance with the content of the production process, the throughputs of each of the production processes can be given in processed volume per unit time. The processed weights and processed numbers per unit time appearing in FIG. 3 are merely examples for describing the configuration of the first information G1, and the numerical values shown in FIG. 3 are not intended to limit the disclosure.

Numbers 240 shown above the links 220 interconnecting the nodes 210 representing flavoring processes and the nodes 210 representing the weighing processes represent the weights of the flavored articles retained between the flavoring processes and the weighing processes. Furthermore, triangular symbols 242 above the numbers indicate, by the directions in which their apexes point, whether the weights of the flavored articles retained between the flavoring processes and the weighing processes are tending to increase or tending to decrease.

The first information G1 displays the nodes 210 representing the production processes in modes that differ between a case where the throughputs—particularly the production throughputs—of each of the production processes are equal to or greater than the target throughputs of those production processes and a case where the throughputs of each of the production processes are smaller than the target throughputs of those production processes.

For example, in FIG. 3, node 212, which is one of the nodes 210, is displayed in the mode of the case where the throughput of the packaging process (the production throughput of the bag-making and packaging device 7) is equal to or greater than the target throughput set for that packaging process (the target throughput of the bag-making and packaging device 7). Furthermore, node 214, which is one of the nodes 210, is displayed in the mode of the case where the throughput of the packaging process (the throughput of the bag-making and packaging device 8) is smaller than the target throughput set for that packaging process (the target throughput of the bag-making and packaging device 8).

The throughputs of the production processes can also have, in addition to the target throughputs, further reference values (called second reference values). The second reference values are, for example, values smaller than the target throughputs. The second reference values are, for example, grasped by the controllers of the devices 10, 20, 30, 40, 50, and 60 and transmitted via the gateway 120 to the server 110 like the target throughputs. The second reference values are, for example, values with which it is estimated that there is a significant problem in a production process in a case where the throughput is below that value. The first information G1 can display the nodes 210 representing the production processes in modes that differ between in a case where the throughputs of the production processes are equal to or greater than the target throughputs, a case where the throughputs of the production processes are equal to or greater than the second reference values and smaller than the target throughputs, and a case where the throughputs of the production processes are less than the second reference values.

For example, node 214 in FIG. 3 is displayed in the mode of the case where the throughput of the packaging process (the throughput of the bag-making and packaging device 8) is smaller than the target throughput of that packaging process (the target throughput of the bag-making and packaging device 8) and equal to or greater than the second reference value per unit time of that packaging process. Furthermore, node 216, which is one of the nodes 210, is displayed in the mode of the case where the throughput of the packaging process (the throughput of the bag-making and packaging device 5) is smaller than the second reference value per unit time set for that packaging process (the second reference value per unit time of the bag-making and packaging device 5).

Though this is not intended to be limiting, making the modes of display different includes, for example, making the display colors of the nodes 212, 214, and 216 different, displaying any of the nodes 212, 214, and 216 continuously while making others blink, making the display sizes of the nodes 212, 214, and 216 different, and making the thicknesses of the lines representing the nodes 212, 214, and 216 different. In FIG. 3, differences in the modes of display of the nodes 212, 214, and 216 are indicated by the presence or absence of hatching and a difference in the type of hatching.

In this embodiment, the server 110 acquires the target throughputs and the second reference values transmitted via the gateway 120 from the controllers of the devices 10, 20, 30, 40, 50, and 60. However, instead of this configuration, the server 110 can also acquire the target throughputs and/or the second reference values input to the computer 300 (set by a user) and utilize this to generate the first information G1.

The generation unit 116 preferably automatically generates the first information G1. In other words, the generation unit 116 automatically generates, based on the throughputs of each of the production processes that the first acquisition unit 112 has acquired and the information (the process-related information) representing the associations between the production processes of the production process group 1 that the second acquisition unit 114 has acquired, the image information of the first information G1 in which the nodes 210 each representing one of the plural production processes are interconnected by the links 220 representing the connections between the production processes and the branches of the production processes and in which the throughputs of the production processes are displayed in the nodes 210.

Figure 6:
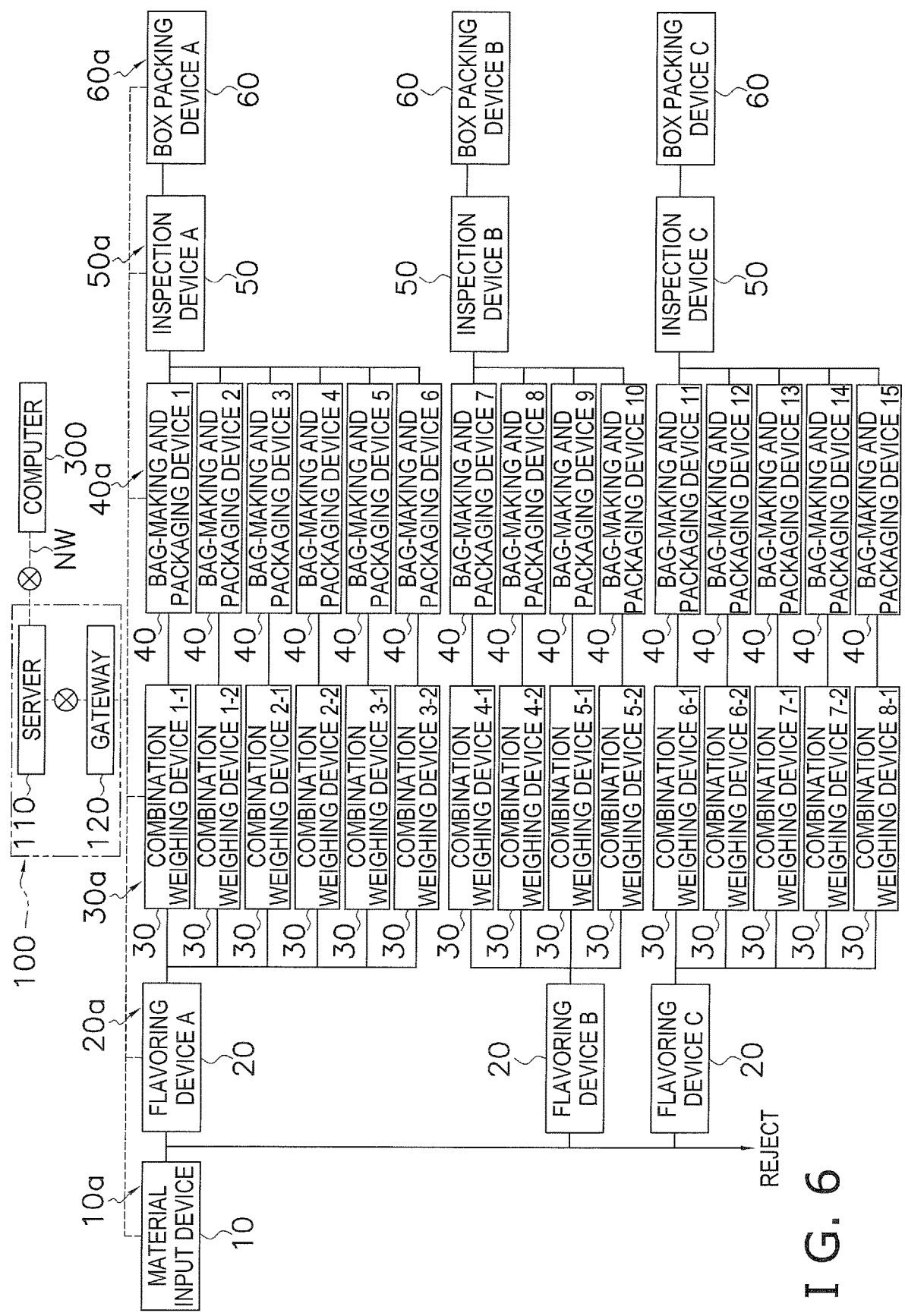
FIG. 6 is a block diagram schematically showing a state in which some of the connections between the production processes have been changed in the production process group of FIG. 1.
Figure 7:
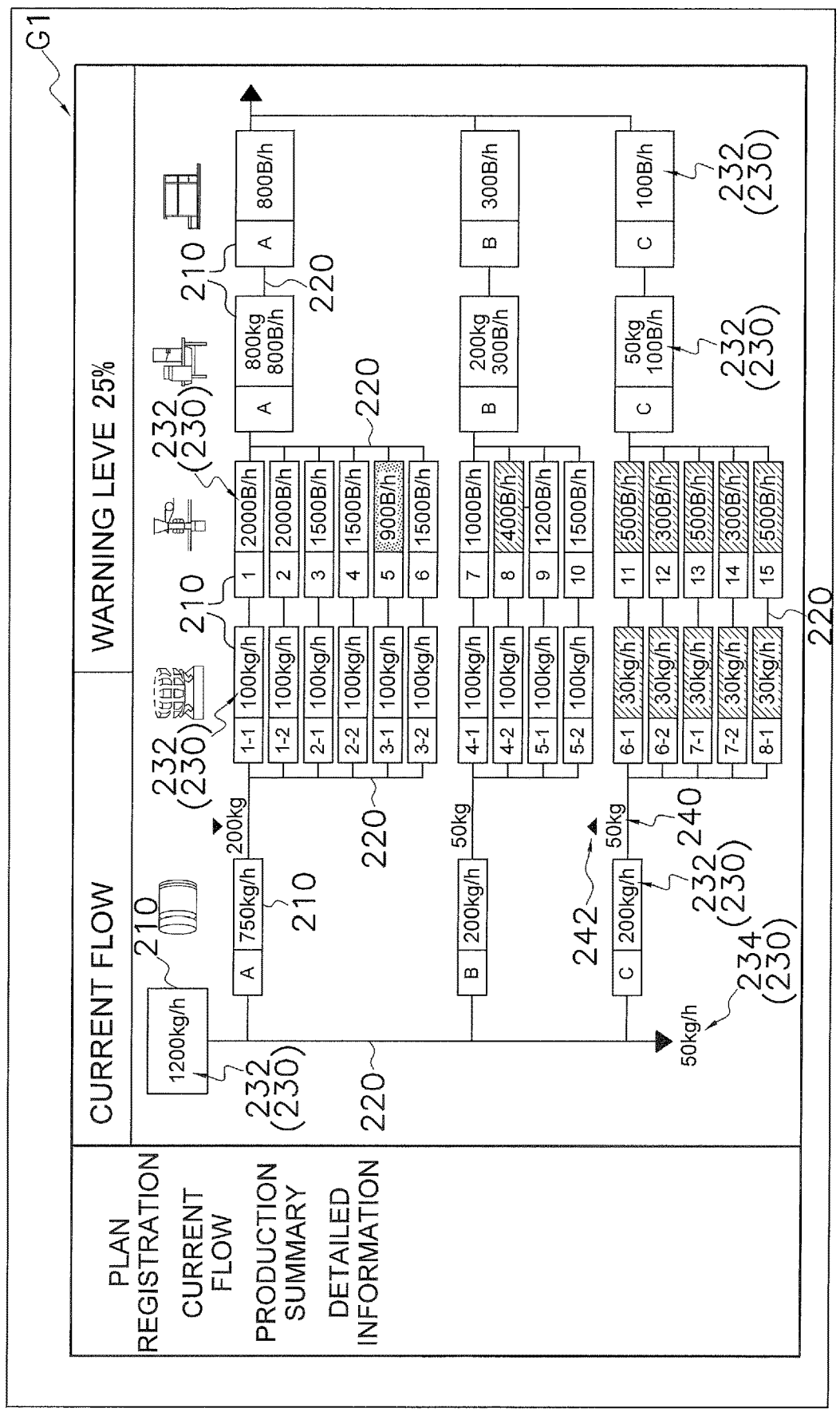
FIG. 7 is an example of the first information that the food production management system generates when the connections between the production processes have been changed as in FIG. 6.

The automatic generation will be described by way of an example. Here, it is assumed, for example, that the production processes had been interconnected as in FIG. 1 and the connections between the production processes are changed as in FIG. 6. Namely, it is assumed that whereas initially the combination weighing device 4-1 and the combination weighing device 4-2 had been connected to the flavoring device A as in FIG. 1, and the combination weighing device 4-1 and the combination weighing device 4-2 are changed to be connected to the flavoring device B as in FIG. 6. In this case, it is preferred that the generation unit 116 automatically generate, based on the information representing the most recent associations between the production processes of the production process group 1 that the second acquisition unit 114 has acquired, an image in which the nodes 210 are interconnected by the links 220 as in FIG. 7.

However, the generation unit 116 can also display, in appropriate positions in an image prepared beforehand in which the nodes 210 are interconnected by the links 220, the information 230 representing the throughputs of each of the production processes. For example, this type of method can be employed in a case where the production processes of the production process group 1 are not frequently changed.

Furthermore, for example, plural images in which the nodes 210 are interconnected by the links 220 can also be prepared beforehand in a storage unit (not shown in the drawings) of the server 110. In this case, when generating the first information G1, the generation unit 116 can display, in appropriate positions in one image that the user has selected via the computer 300 (an image in which current connections/branches of the production processes are indicated by the links 220), the information 230 representing the throughputs of each of the production processes.

Furthermore, it is preferred that the generation unit 116 generate second information G2. The second information G2 is image information displaying in graph form the throughputs of each of the production processes as in FIG. 4. FIG. 4 illustrates a configuration where the throughputs are displayed in graph form only in regard to the flavoring process 20a, but the second information G2 is not limited to this and can also include graphs of the throughputs of the other production processes. Also, FIG. 4 shows, by means of bar graphs, the throughputs of each of the production processes, but the type of graph can be appropriately chosen.

Figure 5:
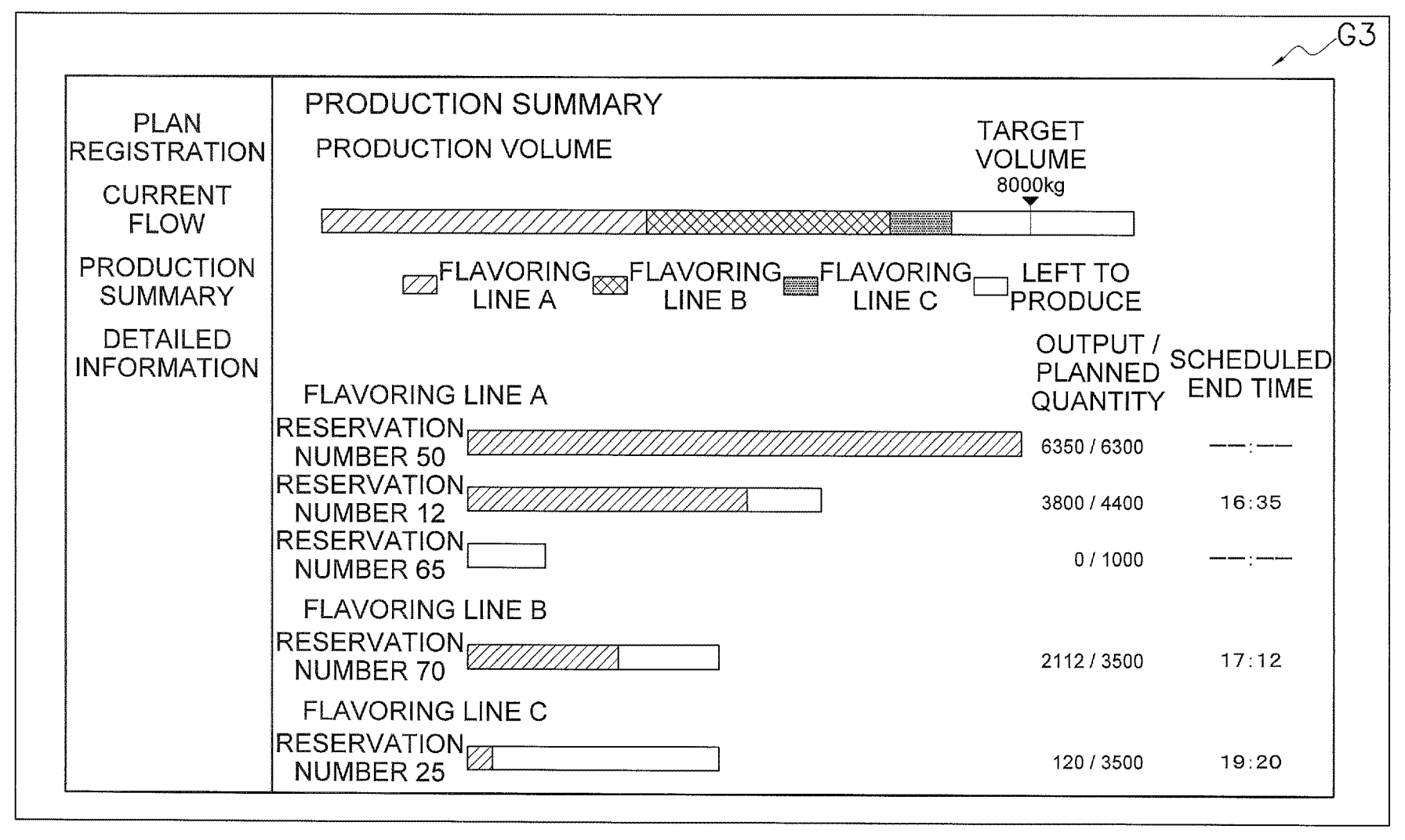

Moreover, the generation unit 116 can generate third information G3. The third information G3 is image information representing a summary of production statuses as in FIG. 5. For example, the third information G3 represents, by means of a bar graph, whether the production volume (integrated value of the throughputs) of the articles has reached a target weight in terms of the production process group 1 overall. The bar graph representing the production volume of the production process group 1 overall is displayed in such a way that one can understand the production volumes of the articles in each of the flavoring device A, the flavoring device B, and the flavoring device C. Moreover, in the third information G3, outputs and planned numbers are displayed by means of bar graphs and numerical values per task (reservation number) regarding the production processes corresponding to each of the flavoring device A, the flavoring device B, and the flavoring device C. Furthermore, in the third information G3, scheduled end times for each task are displayed regarding the production processes corresponding to the each of flavoring device A, the flavoring device B, and the flavoring device C.

(2-2-2-4) Output Unit

The output unit 118 outputs (transmits) the first information G1 to the computer 300 via the network NW in response to a request from the computer 300. Furthermore, the output unit 118 outputs (transmits) the second information G2 to the computer 300 via the network NW in response to a request from the computer 300. Moreover, the output unit 118 outputs (transmits) the third information G3 via the network NW in response to a request from the computer 300.

(3) Characteristics 3-1

The food production management system 100 of the embodiment is a system that manages the food production process group 1 having plural types of production processes. The food production management system 100 includes the first acquisition unit 112 and the output unit 118. The first acquisition unit 112 acquires the throughputs of each of the production processes. The output unit 118 outputs the first information G1. The first information G1 includes the information 230 representing the throughputs of each of the production processes.

In the food production management system 100 of the embodiment, the first information G1 including the information representing the throughputs of each production process is output, so when a problem occurs, such as a delay in the progress of production in the production process group 1 overall, it is easy to grasp which production process has the problem.

3-2

In the food production management system 100 of the embodiment, the first information G1 further includes information representing connections between the production processes and/or branches of the production processes.

In the food production management system 100 of the embodiment, when a problem occurs, such as a delay in the progress of production in the production process group 1 overall, it is possible to easily grasp which production process is rate-limiting and to quickly take a countermeasure to the delay in progress.

3-3

In the food production management system 100 of the embodiment, the first information G1 is image information that displays the nodes 210, the links 220, and the information 230 representing the throughputs of each of the production processes. The nodes 210 represent each of the plural production processes. The links 220 represent the connections between the production processes and/or the branches of the production processes.

In the food production management system 100 of the embodiment, when a problem occurs, such as a delay in the progress of production in the production process group 1 overall, it is possible to easily grasp which production process is rate-limiting and to quickly take a countermeasure to the delay in progress.

3-4

In the food production management system 100 of the embodiment, the plural production processes include a first production process. The first information G1 displays, in modes that differ between a case where the throughput of the first production process is equal to or greater than a target throughput set for the first production process and a case where the throughput of the first production process is smaller than the target throughput, the nodes 210 representing the first production process. The target throughput is an example of a first reference value.

Though this is not intended to be limiting, a case where the first production process is the packaging process 40a will be described as an example with reference to FIG. 3.

In FIG. 3, the node 212 is displayed in the mode of the case where the throughput of the packaging process (the throughput of the bag-making and packaging device 7) is equal to or greater than the target throughput of that packaging process (the target throughput of the bag-making and packaging device 7). Furthermore, the node 214 is displayed in the mode of the case where the throughput of the packaging process (the throughput of the bag-making and packaging device 8) is smaller than the target throughput of that packaging process (the target throughput of the bag-making and packaging device 8).

Instead of, or in addition to, displaying the nodes 210 in different modes, the first information G1 can display, in modes that differ between in a case where the throughput of the first production process is equal to or greater than a first reference value set for the first production process and a case where the throughput of the first production process is smaller than the first reference value, the information representing the throughput of the first production process.

The food production management system 100 of the embodiment is convenient because a delay occurring in each production process can be instantaneously grasped.

3-5

The food production management system 100 of the embodiment includes the second acquisition unit 114 and the generation unit 116. The second acquisition unit 114 acquires information representing associations between the production processes. The generation unit 116 automatically generates, based on the information representing the associations between the production processes that the second acquisition unit 114 has acquired, the image information of the first information G1 in which the nodes 210 representing each of the plural production processes are interconnected by the links 220 representing the connections between the production processes and/or the branches of the production processes.

In a food plant, there are cases where the production flow is changed relatively frequently. For example, there are cases where the production flow is changed so that devices that had been used to produce a food with a certain flavor are used to produce a food with another flavor.

In the food production management system 100 of the embodiment, the image information serving as the first information G1 is automatically generated when the information representing the associations between the production processes is changed, so it is easy to manage the production processes using the food production management system 100 immediately after the production flow is changed.

3-6

In the food production management system 100 of the embodiment, regarding at least part of the production processes, the throughputs of each of the production processes include production throughputs and reject throughputs of each of the production processes.

In the food production management system 100 of the embodiment, the first information G1 includes production throughputs and reject throughputs, so problems in the production processes, such as an increase in the reject throughput even though the production throughput is meeting a standard, can also be grasped.

3-7

In the food production management system 100 of the embodiment, the output unit 118 outputs, as the second information G2, image information displaying in graph form the throughputs of each of the production processes.

In the food production management system 100 of the embodiment, the throughputs of the production processes can be easily grasped by the second information G2 displaying in graph form the throughputs of each production process.

3-8

In the food production management system 100 of the embodiment, the throughputs of each of the production processes are processed weights per unit time or processed numbers per unit time.

In the food production management system 100 of the embodiment, the throughputs of each production process can be easily grasped by weight or quantity.

3-9

In the food production management system 100 of the embodiment, the types of the production processes include at least one of the material input process 10*a*, the flavoring process 20*a*, the weighing process 30*a*, the packaging process 40*a*, the inspection process 50*a*, and the box packing process 60*a*. In particular, in the embodiment, the types of the production processes include all of the material input process 10*a*, the flavoring process 20*a*, the weighing process 30*a*, the packaging process 40*a*, the inspection process 50*a*, and the box packing process 60*a*.

(4) Example Modifications

Example modifications of the embodiment will be described below. Some or all of the characteristics of each of the following example modifications can also be combined with those of another example modification to the extent that they are not mutually incompatible.

(4-1) Example Modification A

The embodiment describes a case where the first information G1, the second information G2, and the third information G3 that the output unit 118 outputs are image information. However, the first information G1, the second information G2, and the third information G3 are not limited to image information. Some or all of the first information G1, the second information G2, and the third information G3 that the output unit 118 transmits can be data with which the computer 300 receiving these sets of information can output, to a display or the like, images such as those exemplified in FIG. 3 to FIG. 5 by executing application software.

(4-2) Example Modification B

In the embodiment, the server 110 connected via the network NW to the controllers of the devices 10, 20, 30, 40, 50, and 60 of the production process group 1 mainly functions as the food production management system 100. However, the configuration of the food production management system is not limited to this configuration. For example, a computer installed in the food plant that has the production process group 1 can also have the same functions as those of the food production management system 100.

(4-3) Example Modification C

In the embodiment, the image of the first information G1 includes the nodes 210 and the links 220. However, the image of the first information G1 is not limited to this configuration, and illustration of the links 220 can also be omitted. However, even in a case where illustration of the links 220 is omitted, it is preferred that the nodes 210 be displayed in such a way that the connections between the production processes can be grasped.

Figure 8:
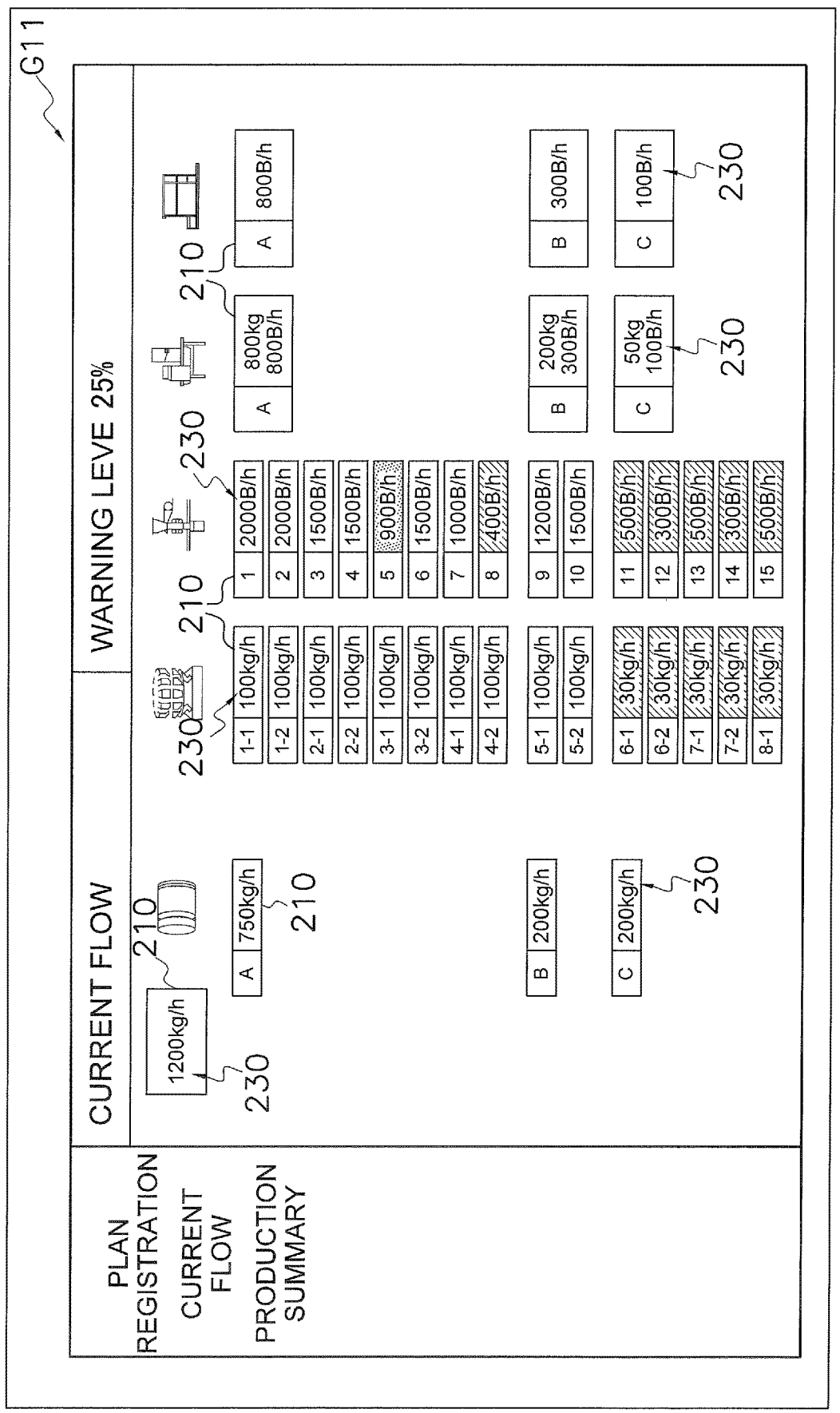
FIG. 8 is an example of the first information that the food production management system pertaining to example modification C outputs.

For example, in first information G11 shown in FIG. 8, illustration of the links 220 is omitted, and the production process corresponding to the combination weighing devices 30 (the combination weighing devices 1-1, 2-1, . . . , 4-2) connected to the flavoring device A is illustrated above the production process corresponding to the flavoring device B. In FIG. 8, the connection between the production process corresponding to the flavoring device A and the production process corresponding to the combination weighing devices 1-1, 2-1, . . . , 4-2 is represented by the configuration of this illustration.

Moreover, in another configuration, in the image of the first information G1, illustration of the links 220 can be omitted, and the node 210 representing the production process corresponding to the combination weighing devices 30 connected to the flavoring device A can be displayed in the same color as the node 210 representing the production process corresponding to the flavoring device A. Using this configuration also, it is possible to easily grasp the connections between the production processes from the first information G1.

(4-4) Example Modification D

In the embodiment, the second acquisition unit 114 acquires, as the information representing the associations between the production processes of the production process group 1, information relating to the upstream devices to which the devices 20, 30, 40, 50, and 60 are connected, which is transmitted from the gateway 120. However, the second acquisition unit 114 can also acquire other information as the information representing the associations between the production processes of the production process group 1.

For example, it is assumed that, in the production process group 1, individual reservation numbers are allocated to each of a series of the production activities of manufacturing. In each of a series of the production activities of manufacturing to which allocation numbers are allocated, a planned quantity of bags packed with articles of a certain flavor are produced and are packed in the boxes. For example, describing this by way of a specific example on the basis of FIG. 5, in the production process group 1, the reservation number "50" is allocated to a series of production activities in which 6,350 bags packed with articles flavored in the flavoring device A (flavoring line A) are manufactured and box packed. It is further assumed that reservation numbers for production activities to which each of the devices 20, 30, 40, 50, and 60 contributes are stored in the controllers of each of the devices 20, 30, 40, 50, and 60 of the production process group 1. In this case, the second acquisition unit 114 can acquire the reservation numbers as the information representing the associations between the production processes of the production process group 1 from the controllers of each of the devices 20, 30, 40, 50, and 60. By configuring the system in this way, the generation unit 116 can automatically generate, based on the reservation numbers that the second acquisition unit 114 has acquired, the image information of the first information G1 in which the nodes 210 representing each of the plural production processes are interconnected by the links 220 representing the connections between the production processes and the branches of the production processes.

Furthermore, for example, in the production process group 1, reservation numbers that differ by production process can also be allocated to the same production activity. For example, to describe this by way of a specific example based on FIG. 5, in the production process group 1, the reservation number "50" (this number is expediently called an overall reservation number "50") is allocated to a series of production activities in which 6,350 bags packed with articles flavored in the flavoring line A are manufactured and packed in the box. Additionally, for example, reservation numbers (this number is expediently called as process-differentiated reservation numbers) different from reservation number "50" are stored in the controllers. For example, the process-differentiated reservation numbers "250" is stored in the controllers of the flavoring devices 20 of the production process group 1 that contribute to the production activities of the overall reservation number "50". The process-differentiated reservation numbers "350" is stored in the controllers of the combination weighing devices 30 of the production process group 1 that contribute to the production activities of the overall reservation number "50." In this case, the second acquisition unit 114 can acquire the process-differentiated reservation numbers as the information representing the associations between the production processes of the production process group 1 from the controllers of each of the devices 20, 30, 40, 50, and 60. Here, it is assumed that information (e.g., a correspondence table) representing correspondence relations between process-differentiated reservation numbers and aggregate reservation numbers is stored in the server 110. The generation unit 116 can automatically generate, based on the information representing the correspondence relations between the process-differentiated reservation numbers and the aggregate reservation numbers and the process-differentiated reservation numbers acquired from the controllers of each of the devices 20, 30, 40, 50, and 60, the image information of the first information G1 in which the nodes 210 representing each of the plural production processes are interconnected by the links 220 representing the connections between the production processes and the branches of the production processes.

Furthermore, for example, the second acquisition unit 114 can acquire, as the information representing the associations between the production processes of the production process group 1, a schedule that relates to how the production processes are interconnected in the production process group 1 and which, for example, a computer (not shown in the drawings) that integrally manages the devices 20, 30, 40, 50, and 60 transmits. The generation unit 116 can automatically generate, based on the acquired schedule of interconnections between the production processes, the image information of the first information G1 in which the nodes 210 representing each of the plural production processes are interconnected by the links 220 representing the connections between the production processes and the branches of the production processes.

(4-5) Example Modification E

Figure 9:
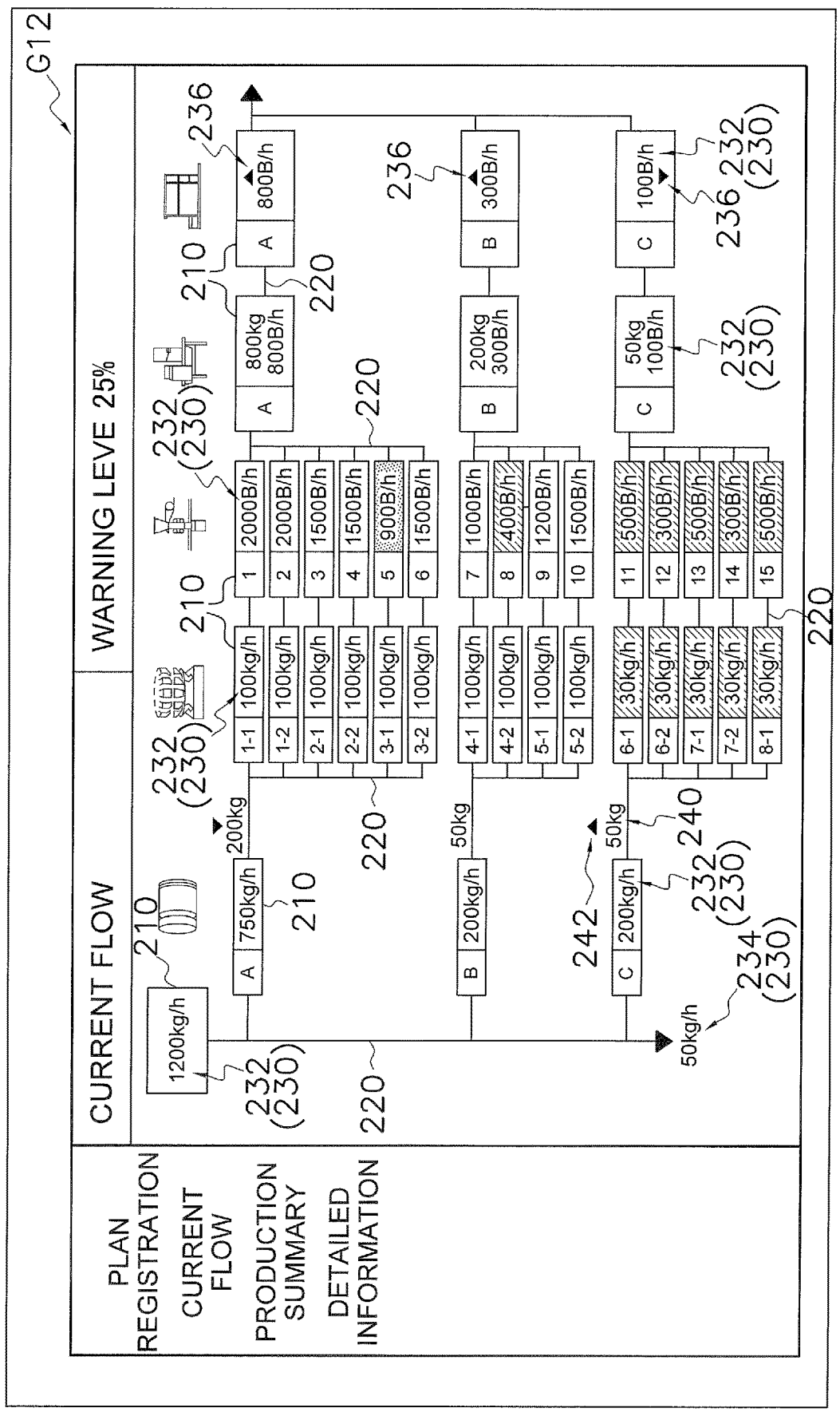
FIG. 9 is an example of the first information that the food production management system pertaining to example modification E outputs.

The first information can include, in addition to the information 230 representing the throughputs of each of the production processes, information 236 representing increasing/decreasing states of the throughputs of the production processes such as in first information G12 shown in FIG. 9. "Information 236 representing increasing/decreasing states of the throughputs of the production processes" means information representing whether the throughputs of the production processes are tending to increase, are tending to decrease, or are generally constant.

In FIG. 9, the information 236 indicating increasing/decreasing states of the throughputs is added only to the box packing process 60a, but the information 236 indicating increasing/decreasing states of the throughputs can also be added to the other types of production processes. Preferably, the information 236 indicating increasing/decreasing states of the throughputs is included regarding all the production processes.

In FIG. 9, as the information 236 indicating increasing/decreasing states of the throughputs, triangular symbols are used to show, by the direction in which their apexes point, whether the throughputs of the production processes are tending to increase or tending to decrease. Furthermore, although it is not illustrated in FIG. 9, in a case where the throughput of a production process is generally constant, the fact that the throughput of the production process is generally constant can be shown by, for example, displaying a "-" symbol or not displaying the triangular symbol. The information 236 representing increasing/decreasing states of the throughputs can also be represented by symbols other than triangular symbols or can also be indicated by text such as "increasing" and "decreasing." Furthermore, the information 236 representing increasing/decreasing states of the throughputs can also be presented by displaying in different modes the nodes representing the production processes and/or the information representing the throughputs of the production processes.

By using this kind of first information G12, it is possible to grasp not only the throughputs of the production processes but also whether the throughputs are tending to increase or tending to decrease, and it is easy to accurately grasp the statuses of the production processes.

REFERENCE SIGNS LIST

1 Production Process Group
10*a* Material Input Process (Production Process)
20*a* Flavoring Process (Production Process)
30*a* Weighing Process (Production Process)
40*a* Packaging Process (Production Process)
50*a* Inspection Process (Production Process)
60*a* Box Packing Process (Production Process)
100 Food Production Management System
112 First Acquisition Unit
114 Second Acquisition Unit
116 Generation Unit
118 Output Unit
G1 First Information
G11 First Information
G12 First Information
G2 Second Information
210 Nodes
212 Node
214 Node
216 Node
220 Links
230 Information Representing Throughputs of Production Processes
232 Information Representing Production Throughputs of Production Processes
234 Information Representing Reject Throughputs of Production Processes
236 Information Representing Increasing/Decreasing States of Throughputs of Production Processes

What is claimed is:

1. A food production management system that manages a food production process group having a plurality of production processes, the food production management system comprising:
a controller configured to
acquire a processing amount per unit time in each of the plurality of production processes,
output first information, the first information including real-time information representing the processing amount per unit time in each of the plurality of production processes, the first information further including a first image in which the plurality of production processes are depicted with symbols respectively, and the symbols are connected with lines representing a sequential order in which an article processed by an upstream production process is sent to a next production process,
acquire association information relating to associations between the plurality of production processes, and automatically generate the first image based on the association information.

2. The food production management system according to claim 1, wherein the first information further includes information representing connections between the plurality of production processes, and/or branches of the plurality of production processes.

3. The food production management system according to claim 2, wherein the first information is image information that displays nodes representing each of the plurality of production processes, links representing the connections between the plurality of production processes and/or the branches of the plurality of production processes, and the information representing the processing amount per unit time in each of the plurality of production processes.

4. The food production management system according to claim 3, wherein
the plurality of production processes include a first production process, and
the first information displays, using different types of indicators, a case where a processing amount per unit time in the first production process is equal to or greater than a first reference value set for the first production process and a case where the processing amount per unit time in the first production process is smaller than the first reference value.

5. The food production management system according to claim 1, wherein regarding at least part of the plurality of production processes, the processing amount per unit time in each of the plurality of production processes include a production amount and a reject amount as a non-conforming article in each of the plurality of production processes.

6. The food production management system according to claim 1, wherein the controller is further configured to output, as second information, image information displaying in graph form the processing amount per unit time in each of the plurality of production processes.

7. The food production management system according to claim 1, wherein the first information further includes information representing increasing/decreasing states of the processing amount per unit time in the plurality of production processes.

8. The food production management system according to claim 1, wherein the processing amount per unit time in each of the plurality of production processes are processed weights per unit time or processed numbers per unit time.

9. The food production management system according to claim 1, wherein the plurality of production processes include at least one of a material input process, a flavoring process, a weighing process, a packaging process, an inspection process, and a box packing process.

* * * * *